July 24, 1956 A. C. KIDD 2,756,172
PIPE COVERINGS
Filed Dec. 27, 1955 3 Sheets-Sheet 2
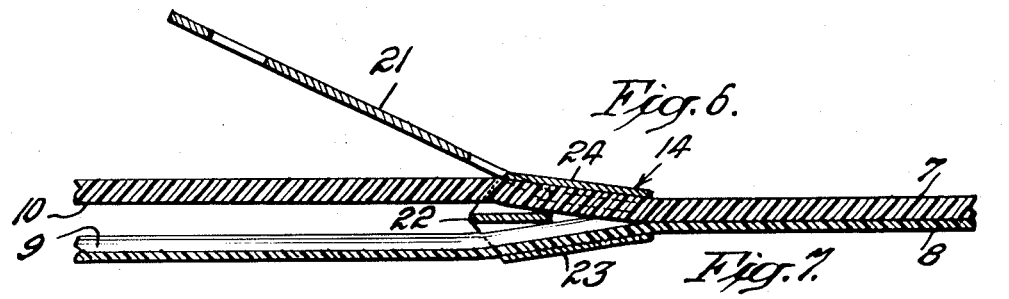
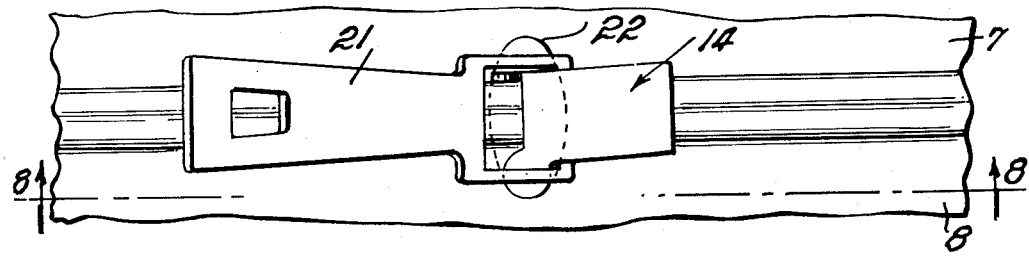
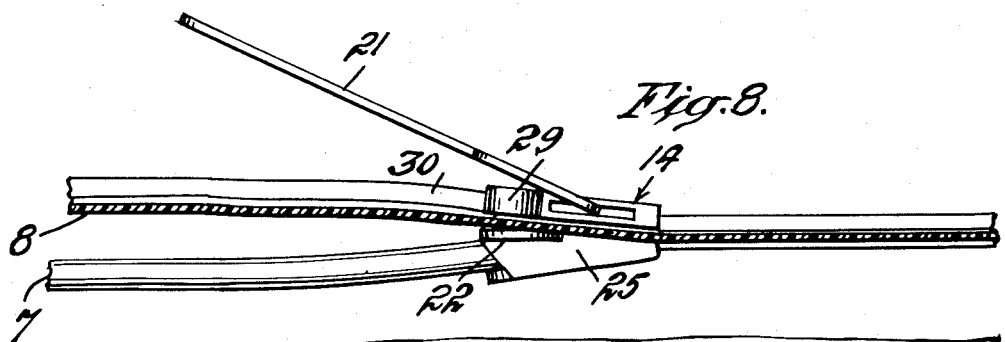
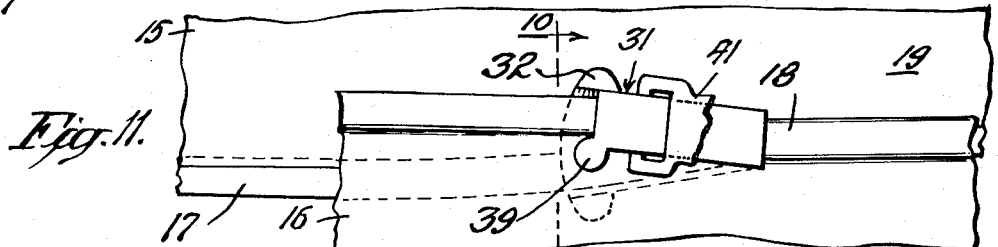
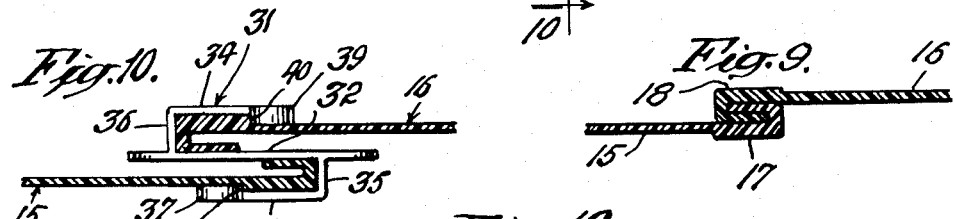
INVENTOR.
Alexander C. Kidd
BY Gustav Drews
his ATTORNEY

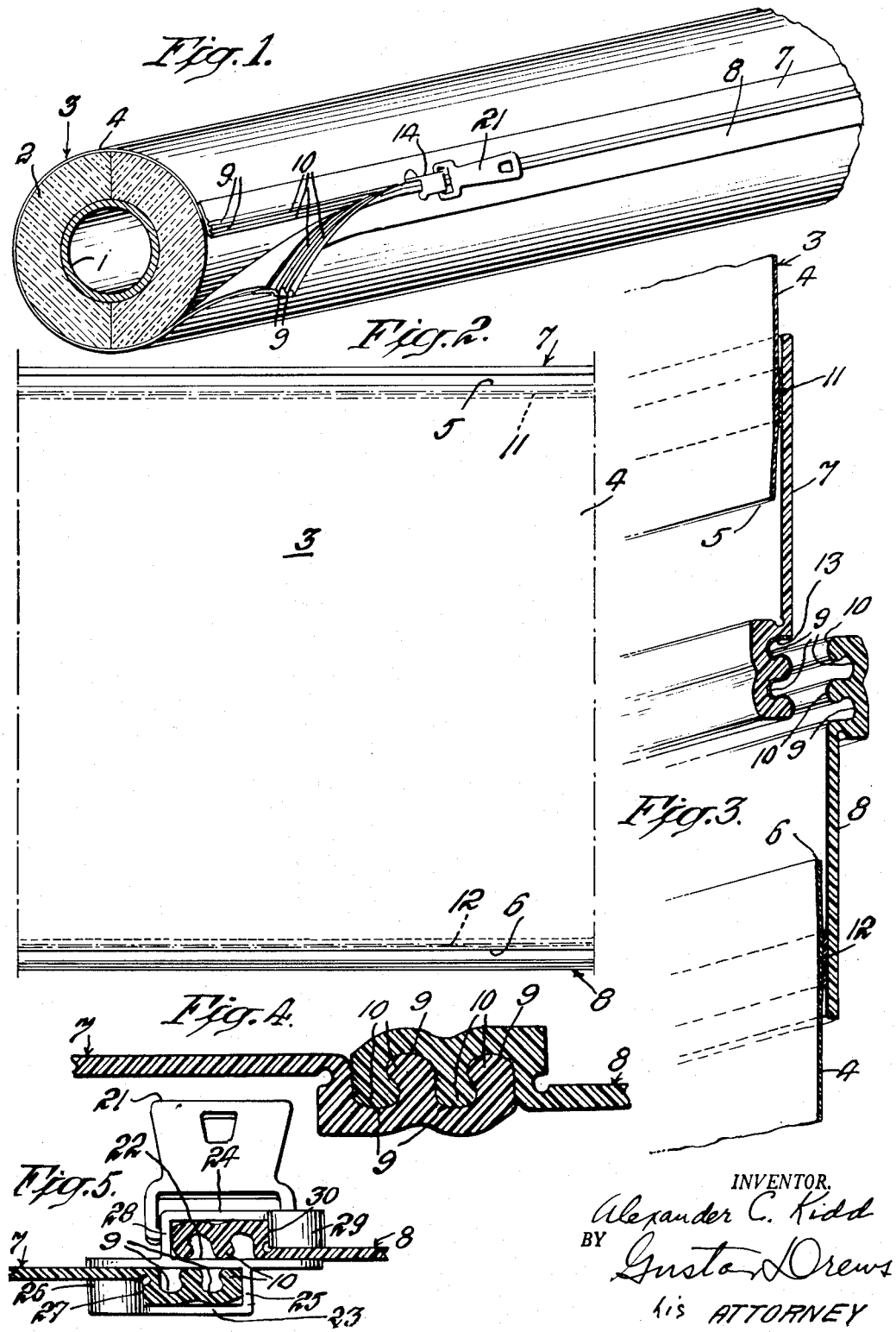

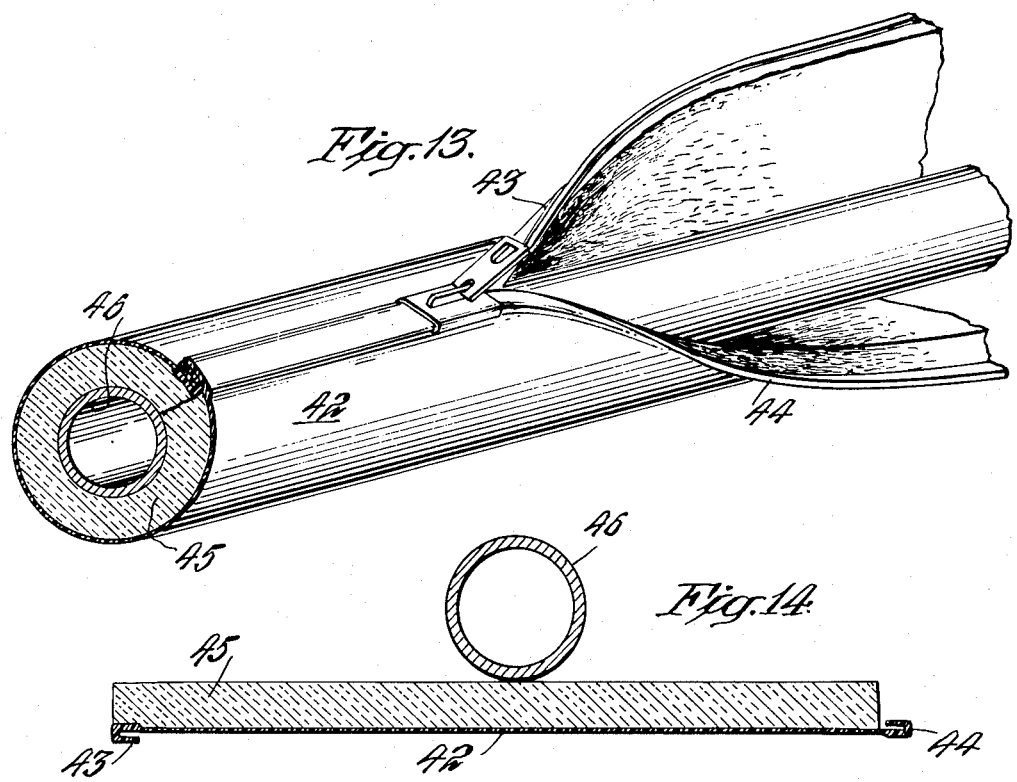
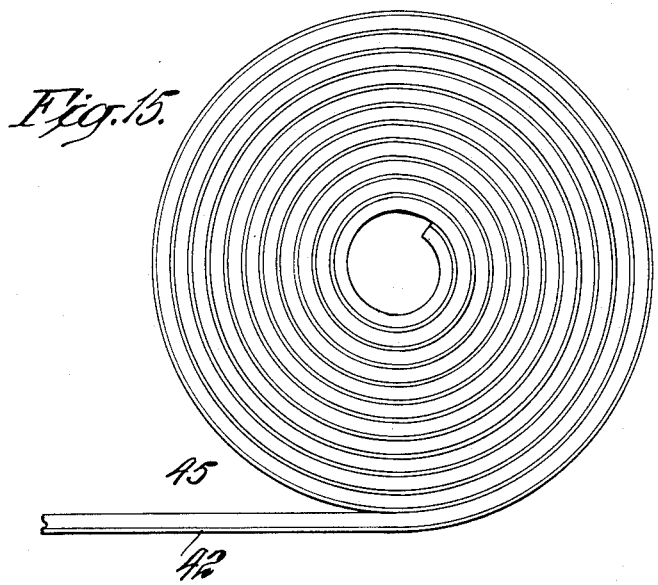
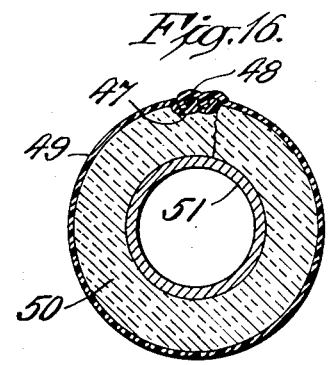

United States Patent Office 2,756,172
Patented July 24, 1956

2,756,172

PIPE COVERINGS

Alexander C. Kidd, South Orange, N. J.

Continuation of application Serial No. 414,355, March 5, 1954. This application December 27, 1955, Serial No. 555,544

9 Claims. (Cl. 154—44)

This invention relates to pipe coverings in general, and more especially to coverings for electric wiring and for steam, gas, oil and water pipes or conduits which have previously been encased in insulating wrappers such as asbestos and the like.

In the practice heretofore followed, pipes composed of cast iron, copper and the like, have been extensively used as conduits to convey and transport steam, gas, oil, fresh and sea water, both hot and cold, and as conduits to encase electric conductors and the like, which pipes in turn have been encased in an insulating layer composed of asbestos or the like, which insulating layer in turn has been enclosed and anchored in place by sheets of canvas, the longitudinal edges of which have been sewn or otherwise secured to one another, or enclosed and anchored in place by lengths of tape which have been spirally wrapped around the insulating layer. Extensive efforts have been made to find a substitute for the conventional canvas covering not only on account of the cost entailed in securing the canvas in place, but also on account of the inability of the canvas to withstand corrosion due to a moisture environment due to fresh water on land or from sea water at sea, but also on account of the inability of the canvas to prevent moisture being transmitted to the insulating layer, and the inability of the canvas to withstand electrolytic corrosion, destruction from fire, soil chemicals, oils, fats, soil bacteria, fungi, parasites, termites, and the like. A decided advance was made when it was discovered that Scotch tape could be spirally wrapped around the insulating layer, since Scotch tape constituted a fair barrier to moisture, soil chemicals, oils, fats, electric ground currents, soil bacteria, fungi and the like. However, the cost of labor to wrap the tape exceeded the cost of securing the canvas sheets in place.

With the foregoing in mind, it is an object of the present invention to provide a wrapper that can be anchored or secured in place at a minimum cost of labor, which wrapper is comparatively inexpensive as compared to canvas, and which in addition is not only non-inflammable, proof against corrosion from fresh as well as sea water, ground electric currents, soil chemicals, bacteria and fungi, fats, oils and the many soil parasites and termites, but also constitutes an effective barrier against fire, water vapor, and the transmission of fresh as well as sea water, electric currents, fats, oils and soil chemicals, bacteria, fungi, parasites and termites.

More specifically, it is an object of the present invention to provide a covering for steam, gas, oil, water, electricity and the like pipes and conduits which have previously been encased in an insulating wrapper such as asbestos and the like, which covering is composed primarily of a copolymer resin such as a calendered sheet of polyvinyl chloride acetate and a plasticizer mixture, such as a phthalate ester or a polyester type or a mixture of the two, the longitudinal edges of which have secured thereto extruded non-rigid tapes or ribbons composed of substantially the same plastic material as that of the calendared sheets, which tapes are secured to the longitudinal sheets by thermal heat, high frequency heat or plastic cement, and which tapes have interlocking jaws which may with facility be interlocked and secured in place by the interlocking edges supplemented by an adhesive cement, thermal or high frequency heat.

In addition to the many advantages from the standpoint of its immunity to destruction by corrosion and its ability to serve as a barrier as aforesaid, the improved covering here provided is exceedingly light in weight in the interest of reducing the cost of shipping as well as handling the same to a minimum, and is also exceedingly low in cost to manufacture and to assemble.

It is still another object of the present invention to provide a covering for a pipe, tubing or wiring in which the insulation is attached to the outer sheet as a result of which no moisture, injurious gases and the like can be trapped between the sheet and the insulation, or between the insulation and the pipe, tubing or wiring during wrapping, in which the insulation will contribute to keep the covering in place and protect it from sagging, especially when wrapped around a vertically extending pipe, tubing, wiring or the like, and which covering is sufficiently yieldable to adapt itself to a number of predetermined sizes of pipe, tubing, or wiring.

This application constitutes a continuation in part of application for patent Serial No. 414,355, filed March 5, 1954, now abandoned.

These and other features, capabilities and advantages of the present invention will appear from the subjoined detailed description of specific embodiments thereof illustrated in the accompanying drawings, in which Fig. 1 is a perspective of a pipe covering in place around the insulating layer previously wrapped around the pipe to be protected.

Fig. 2 is a plan view of a section of the covering before it is secured in place.

Fig. 3 is a fragmental enlarged section showing the two closure ends about to be brought into gripping engagement with one another.

Fig. 4 is a fragmental section still further enlarged showing the closure ends in gripping engagement with one another.

Fig. 5 is an enlarged fragmental transverse section on the scale of Fig. 3 showing the closure shoe, but before the closure ends are in gripping engagement with one another.

Fig. 6 is a longitudinal enlarged section on the scale of Fig. 3 showing the shoe in operative engagement with the closure ends.

Fig. 7 is a fragmental enlarged plan view on the scale of Fig. 3 showing the parts illustrated in Fig. 6.

Fig. 8 is a section on the line 8—8 of Fig. 7.

Fig. 9 is a transverse section of the closure ends in gripping engagement with one another of a second embodiment.

Fig. 10 is a transverse section on the line 10—10 of Fig. 11.

Fig. 11 is a plan view of the parts shown in Fig. 10 showing the closure shoe in operative engagement with the closure ends of the embodiment illustrated in Fig. 9.

Fig. 12 is a transverse cross section similar to Fig. 9 of the second embodiment with the hook portions separated and a cement layer applied to one of the hook portions.

Fig. 13 is a perspective of a third embodiment in which an insulation lining is secured to the outer sheet partly enclosing a pipe and partly open and using the closure disclosed in Figs. 8 to 12, inclusive.

Fig. 14 is a section of the embodiment shown in Fig. 13 showing a pipe resting on a covering before being wrapped.

Fig. 15 is an end view showing a roll of covering with an insulation lining secured to the outer sheet according to the embodiment disclosed in Fig. 13.

Fig. 16 is a section of a pipe wrapped with a covering having an insulation lining attached to the outer sheet and with a closure similar to that disclosed in Figs. 1 to 5, inclusive.

In the embodiment shown in Figs. 1, 2 and 3 there is illustrated a conventional pipe 1 composed of cast iron, copper or the like, for steam, gas, oil, fresh and sea water, both hot and cold, electric conductors and the like, around which is encased the conventional layer 2 of asbestos or the like insulating material, and around which layer 2 in turn is secured in place the improved covering 3 constituting the subject matter of the present invention. The covering 3 is preferably composed of a calendered sheet 4 of a plastic material such as a mixture of a copolymer type of resin, such as polyvinyl chloride acetate and a plasticizer system composed of phthalate ester or a polyester type, or a mixture of the two.

To the longitudinal edges 5 and 6 of the sheet 4 there are secured the closure tapes or ribbons 7 and 8, respectively, preferably composed of extruded plastic material, such as the plastic material of which the sheet 4 is composed. The ribbons 7 and 8 shown in Figs. 2 and 3 preferably have complemental grooves 9 and strips 10, such as disclosed in United States Letters Patents Nos. 2,558,367, 2,613,421, 2,637,085 or 2,637,086. The ribbons 7 and 8 may be secured to the edges 5 and 6 of the sheet 4 in a number of ways without materially departing from the spirit of the invention, but preferably in the interest of forming a positive barrier as hereinafter set forth, the ribbons 7 and 8 are secured to the sheet 4 along the areas 11 and 12 by a high frequency current of about twenty-seven megacycles in accordance with conventional practice.

Excellent results have been achieved when the thickness of the sheet 4 for conventional use would be about .012 of an inch thick or twelve gauge, and the closure tapes or ribbons 7 and 8 about .020 of an inch thick, or twenty gauge. Tests have shown that sheets 4 and closure ribbons 7 and 8 composed of the plastic material aforesaid will withstand temperatures of minus 60° F. to plus 150° F., and that if subjected to temperatures in excess of plus 100° F., but not in excess of 300° F., while a perceptible softening will occur, the sheet 4 and ribbons 7 and 8 will not deteriorate, and upon cooling, if anything, will be slightly more rigid than before having been subjected to such higher temperature.

In actual practice the sheets 4 with their attached closure ribbons 7 and 8 will be fabricated in lengths of about one hundred feet, and in various distinctive colors. It will suffice if the closure ribbons 7 and 8 are prepared in different colors. Consequently, in large buildings, factories, or seagoing vessels, the steam and water pipes can readily be distinguished from one another. As an instance, red could be used for the steam pipes, blue for the water pipes, and yellow for the pipes carrying the electric conductors.

In turn, the closure ribbons 7 and 8 before being brought into gripping engagement with one another may have a plastic cement, such as a layer 13, of polyvinyl chloride cement applied to the outer face of the ribbon 7 before the ribbon 8 is pressed down into gripping engagement with the same.

In turn, as shown in United States Letters Patent No. 2,613,421, a shoe 14, such as shown in Figs. 1, 5, 6 and 7 may be attached to one end of the overlapping ribbons 7 and 8 after the sheet 4 has been wrapped around the insulating layer to be enclosed, and then the shoe 14 moved along the overlapping ribbons 7 and 8 quickly to bring the two ribbons 7 and 8 into gripping engagement with one another.

In the embodiment shown in Fig. 9, instead of the closure tapes or ribbons 7 and 8 there are illustrated two overlapping closure tapes or ribbons 15 and 16 terminating in complemental hook formations 17 and 18, respectively, which will grippingly engage one another to anchor the ribbons 15 and 16 to one another. The hook formations 17 and 18, of necessity, each include a single strip and an adjacent groove corresponding to the strips 10 and grooves 9 of the tapes 7 and 8 in the embodiment of Fig. 4. The formations 17 and 18 have the advantage that they will depend upon the stretchability in the sheet 19 to enable the hook formations 17 and 18 to engage one another, and then due to the elastic ability of the sheet 19 to contract to its prestretched condition, effectively anchor the hook formations 17 and 18 to one another, even without an adhesive cement, such as the layer 13 applied to one of them. Here however, too, in the interest of effecting a foolproof barrier as aforesaid, a layer 20 of cement may also be applied, see Fig. 12.

To enable the shoe 14 of the embodiment of Figs. 1, 5, 6 and 7, to effectively grip while sliding the same along the ribbons 7 and 8, the arm 21 pivotally connected to the shoe 14 is at least one and one-half inches in length in actual practice.

The shoe 14 as shown in Figs. 1, 5, 6 and 7 for the closure ribbons 7 and 8 of the first embodiment has an intermediate partition 22 at its front end spaced from the lower plate portion 23 and the upper plate portion 24. The lower plate portion 23 has a side wall 25 connecting the partition 22 with the lower plate portion 23 and an enlargement 26 to engage the shoulder 27 of the closure ribbon 7, and the upper plate portion 24 has a side wall 28 connecting the partition 22 with the upper plate portion 24 and an enlargement 29 to engage the shoulder 30 of the ribbon 8.

The side walls 25 and 26 taper toward one another as they approach the front end of the shoe 14 and the plates 23 and 24 in turn taper between one another as they approach the rear end of the shoe 14, thereby to draw the two gripping ends of the ribbons 7 and 8 into gripping engagement with one another.

The shoe 31 of the embodiment shown in Figs. 9, 10 and 11 for the second embodiment, instead of drawing the two gripping edges of the ribbons 15 and 16 toward one another from a separated position, draw them toward one another from an overlapped position. For this purpose, the shoe 31 also has an intermediate partition 32 at its front end, a lower plate portion 33, and upper plate portion 34, a side wall 35 connecting the partition 32 to the lower plate portion 33 and a side wall 36 connecting the partition 32 to the upper plate portion 34, with an enlargement 37 to engage the shoulder 38 of the ribbon 15 and an enlargement 39 to engage the shoulder 40 of the ribbon 16. Here too the side walls 35 and 36 taper toward one another as they approach the front end of the shoe 31 and the plate portions 33 and 34 similarly approach one another as they approach the front end of the shoe 31 to draw the overlapped portions 17 and 18 into gripping engagement with one another, that shown in Fig. 8. The shoe 31, see Figs. 10 and 11, has pivotally connected thereto the arm 41, which in the interest of manipulating the shoe 31 also preferably is at least one and one-half inches in length.

In the embodiment shown in Figs. 13, 14 and 15, the sheet 42, similar to the sheet 4 of Fig. 4, has secured to its longitudinally extending edges the closure ribbons 43 and 44, similar to the closure ribbons 17 and 18 of Fig. 11. In this embodiment, however, the sheet 42 has permanently secured to the inner face thereof a lining 45 composed of an insulation material having physical properties or characteristics of "Fiberglas," a product manufactured and distributed at present by Owens-Corning Fiberglas Corporation. The lining 45 may be secured to the sheet 42 by any suitable cement or adhesive such as, or having the physical properties or characteristics of, the non-inflammable, non-toxic, synthetic, resin, rubber emulsion manufactured and distributed by Miracle Adhesives Corporation of New York, New York. Excellent results have been achieved when the thickness of the sheet 42 for conventional use approximated .012 of an inch and the thickness of the lining 45 ranged from one-half of an inch to three-quarters of an inch. Due to the flexibility of the "Fiberglas" lining 45 and the plastic sheet 42, a predetermined width of lining would adjust itself to several sizes of copper tubing, such as the pipe 46. As an instance, a width of covering approximating six inches would accommodate copper tubing of one-half of an inch to three-quarters of an inch in diameter, a width of covering approximating seven inches would accommodate copper tubing of seven-eighths to one and one-eighth inches in diameter, a width of covering approximating eight inches would accommodate copper tubing of one and one-quarter inches to one and five-eighth inches in diameter, a width of covering approximating thirteen inches would accommodate copper tubing of two and one-eighth inches to three and one-eighth inches in diameter, and a width of covering approximating sixteen inches would accommodate copper tubing of three and five-eighths inches to four and one-eighth inches in diameter.

In the embodiment shown in Fig. 16, in place of the closure ribbons 43 and 44, the closure ribobns 47 and 48, similar to the closure ribbons 7 and 8 of the embodiment illustrated in Fig. 1, are shown as attached to the sheet 49, to which in turn the insulation lining 50 is secured with the sheet 49 and insulation lining 50 wrapped around the pipe 51.

It is obvious that various changes and modifications may be made to the details of construction without departing from the general spirit of the invention as set forth in the appended claims.

I claim:

1. A covering for an insulation encased pipe consisting in a sheet of an extended length adapted to be wrapped freely movable around the insulation encased pipe having longitudinally extending edges, and complemental closure forming tapes, one tape for each longitudinally extending edge of said sheet, said sheet and tapes being composed of polyvinyl chloride acetate, the tapes being electronically sealed to said sheet, said closure forming tapes having complemental interlocking grooves and strips, a polyvinyl chloride cement interposed between the engaging faces of said complemental closure tapes, the seal between said closure tapes and said sheet, and the interlocking grooves and strips and the polyvinyl chloride cement between the engaging faces of said complemental closure tapes supplementing said sheet and said closure forming tapes to form an annular vapor and moisture-proof barrier to and from the outside of said covering.

2. A covering for an insulation encased pipe consisting in a sheet of an extended length adapted to be wrapped freely movable around the insulation encased pipe having longitudinally extending edges, and complemental closure forming tapes, one tape for each longitudinally extending edge of said sheet, said sheet and tapes being composed of polyvinyl chloride acetate, the tapes being electronically sealed to said sheet, said closure forming tapes having complemental interlocking longitudinally extending hooks, said hooks having grooves and fingers, the fingers being substantially parallel to the plane of the sheet, overlapping and extending back upon their respective longitudinally extending tapes and extending into the grooves of complemental edges, a polyvinyl chloride cement interposed between the engaging faces of said complemental closure tapes, the seal between said closure tapes and said sheet and the interlocking longitudinally extending hooks and the polyvinyl chloride cement between the engaging faces of said complemental closure tapes supplementing said sheet and said closure forming tapes to form an annular vapor and moisture-proof barrier to and from the outside of said covering.

3. A covering for a metallic structure such as a pipe or wiring consisting in a sheet of an extended length adapted to be wrapped movable around the metallic structure, said sheet having longitudinally extending edges, and complemental closure forming tapes, one tape for each longitudinally extending edge of said sheet, said sheet and tapes being composed of a stretchable, non-inflammable, moisture-proof and electrical insulating plastic material, the tapes being sealed to said sheet, said closure forming tapes having complemental interlocking gripping jaws relying upon the stretchability of the sheet and tapes snugly to engage one another and form a seal between them, the jaws extending parallel to said tapes, the seal between said closure tapes and said sheet and the interlocking gripping jaws supplementing said sheet to form an annular electrical insulating, vapor and moisture-proof barrier to and from the outside of said covering.

4. The combination of a covering for a metallic structure such as a pipe or wiring, an insulation interposed between such metallic structure and said covering, the covering consisting in a sheet extending around the insulation, said sheet having longitudinally extending edges and being free to move relative to the metallic structure, and complemental closure forming tapes, one tape for each longitudinally extending edge of said sheet, said sheet and tapes being composed of a stretchable, non-inflammable, moisture-proof and electrical insulating plastic material, the tapes being sealed to said sheet, said closure forming tapes having complemental interlocking gripping jaws extending parallel to said tapes, the sheet and insulation snugly fitting the metallic structure to enable the gripping jaws relying upon the elasticity of the sheet and tapes snugly to engage one another and form a seal between them, the seal between said closure tapes and said sheet and the interlocking gripping jaws supplementing said sheet to form an annular electrical insulating, vapor and moisture-proof barrier to and from the outside of said covering.

5. A covering for an insulation encased pipe consisting in a sheet of an extended length adapted to be wrapped movable around the insulation encased pipe having longitudinally extending edges, and complemental closure forming tapes sealed to the longitudinally extending edges of the sheet to effect a positive barrier to and from the outside of the covering, said closure forming tapes having complemental interlocking grooves and strips to effect a positive seal or barrier to and from the outside of the covering, said sheet and closure tapes being composed of a stretchable, non-inflammable, moisture-proof and electrically insulating plastic material, the seal of said complemental interlocking grooves and strips between the adjacent closure forming tapes, as well as the seal between said closure forming tapes and said sheet, supplementing said sheet and said closure forming tapes to form an annular non-inflammable, vapor, moisture-proof and electrical barrier to and from the outside of said covering.

6. A covering as set forth in claim 5 in which the sheet is composed of a calendared mixture of a copolymer type of resin such as polyvinyl chloride acetate and a plasticizer system, and the closure forming tapes are composed of extruded mixtures of a copolymer type of resin such as polyvinyl chloride acetate and a plasticizer system.

7. A combination of a shoe and a covering for an insulation encased metallic structure such as a wiring or a pipe consisting in a sheet of an extruded length adapted to be wrapped movable around the insulation encased metallic structure, the sheet having longitudinally extending edges, and complemental closure forming tapes, one tape sealed to each longitudinally extending edge of said sheet, said closure forming tapes having complemental interlocking hook formations, said hook formations extending parallel to and over said tapes and opposed to one another, said sheet and tapes being composed of a stretchable non-inflammable, moisture-proof and electrically insulating plastic material, a shoe slidably connected to the complemental interlocking hook formations, guides in said shoe tapering toward the rear end thereof both in a direction perpendicular to the tapes and in a direction at right angles to the perpendicular to enable the shoe when engaging the two complemental interlocking hook formations and drawn along the same to draw the longitudinally extending edges of the sheet over one another and toward one another into gripping engagement of said interlocking hook formations.

8. The combination as set forth in claim 4 characterized by means securing said insulation to said covering.

9. The combination as set forth in claim 4 characterized by means securing said insulation to said covering and in which said insulation is composed of fiberglass.

References Cited in the file of this patent

UNITED STATES PATENTS

| | | |
|---|---|---|
| 2,027,961 | Currie | Jan. 14, 1936 |
| 2,082,174 | Miller et al. | June 1, 1937 |
| 2,355,816 | Morner | Aug. 15, 1944 |
| 2,602,764 | Billingham | July 8, 1952 |
| 2,613,421 | Madsen | Oct. 14, 1952 |